United States Patent [19]

Kuntz et al.

[11] 4,037,479
[45] July 26, 1977

[54] METHOD AND APPARATUS FOR SENSOR ASSEMBLY INSPECTION

[75] Inventors: William H. Kuntz, Louisville, Ky.; Donald G. Moore, Glencoe, Ill.

[73] Assignee: Chemetron Corporation, Chicago, Ill.

[21] Appl. No.: 636,804

[22] Filed: Dec. 1, 1975

[51] Int. Cl.² ............................................. G01N 29/00
[52] U.S. Cl. ................. 73/432 R; 324/34 R
[58] Field of Search ............... 73/432 R, 67.1, 67.2; 219/10.55 E, 10.55 F; 324/34 PS, 34 D, 34 R

[56] References Cited

U.S. PATENT DOCUMENTS

| | | | |
|---|---|---|---|
| 3,065,412 | 11/1962 | Rosenthal | 324/34 R X |
| 3,531,982 | 10/1970 | Clotfelter et al. | 73/67.2 |
| 3,564,903 | 2/1971 | Woodmansee et al. | 73/67.2 |
| 3,572,502 | 3/1971 | Quinn et al. | 324/34 R X |
| 3,854,021 | 12/1974 | Moore et al. | 219/10.55 F |

Primary Examiner—Richard C. Queisser
Assistant Examiner—Joseph W. Roskos
Attorney, Agent, or Firm—N. M. Esser

[57] ABSTRACT

A method and apparatus for inspecting the location and orientation of a sensor assembly in a tray-sensor arrangement adapted to be placed in a microwave oven. The sensor assembly which includes a ferromagnetic element that absorbs energy when placed in the oven and changes its characteristics when a predetermined amount of energy has been absorbed, is tested in the completely assembled tray by accurately positioning the tray in predetermined relation to an oscillating circuit whose operating frequency is responsive to the presence of the ferromagnetic sensing element. The output frequency of the oscillating circuit indicates whether or not the sensor assembly has been properly assembled and positioned on the tray. The oscillator circuit includes a frequency determining element which produces a distinctly different frequency when the sensor is not properly positioned in the assembly or is omitted from the assembly. The output frequency of the oscillating circuit is supplied to an electronic meter such as a counter or frequency meter to display the operating frequency, or acceptable range of frequencies, to provide an indication of the acceptability of the sensor assembly and tray.

8 Claims, 3 Drawing Figures

METHOD AND APPARATUS FOR SENSOR ASSEMBLY INSPECTION

CROSS-REFERENCES TO RELATED APPLICATIONS

Co-pending application of Donald G. Moore Ser. No. 624,633, filed Oct. 21, 1975 is related to the present application and dicloses the improved tray and sensor assembly for use with a microwave oven.

BACKGROUND OF THE INVENTION

A. Field of the Invention

The present invention relates most generally to testing and inspection apparatus, and more particularly, to a testing apparatus to inspect sensor assemblies carried by a tray for use with a microwave oven to determine if the sensor assembly is properly assembled and positioned.

B. Description of the Prior Art

In institutions, such as hospitals, it is desirable to provide a system whereby a complete meal may be brought up to serving temperature in a single, quick operation. If this can be done, the meals may be prepared in assembly line fashion on week days during normal working hours, and then they may be kept refrigerated until the time when they are to be served.

An electromagnetic heating system to selectively heat various elements of a load, such as a complete meal or the like, in a single operation, to satisfy institutional feeding needs or requirements is described in U.S. Pat. No. 3,854,021 which issued to Donald G. Moore et al on Dec. 10, 1974 and U.S. Pat. No. 3,854,022 which issued to Donald G. Moore Dec. 10, 1974, and these patents are hereby incorporated by reference for all purposes. Further the above identified copending patent application describes an improved tray construction and sensor assembly for use in a microwave oven.

During the assembly of the sensor device in the tray, it is possible and statistically probable that certain errors and unacceptable assemblies will result. For example, the ferromagnetic annular shaped member may be omitted or an electrically conductive nonmagnetic control disc which is positioned on the bottom plane of the ferromagnetic element, may be omitted or positioned on the wrong surface of the ferromagnetic element. It is also possible that ferromagnetic members may be placed in the wrong relative position within the housing of the sensor assembly. In addition, it may be desirable to assemble sensor assemblies on a standard tray with different materials and relative positioning of component parts to achieve various desired effects due to different energy levels and applications. All these improperly assembled or alternatively positioned combinations will result in the sensor assembly operating adversely when the tray is placed in a microwave oven since the position of the sensor relative to the tray is quite critical. The result with an improperly positioned sensor would be that the articles to be heated would be too hot or too cold or possibly the heating cycle would not be initiated.

To avoid such results, it would be desirable to test or inspect the trays after the sensor has been assembled thereon to determine that the sensor has been accurately located in the tray and hence will function properly when placed in a particular microwave oven.

SUMMARY OF THE INVENTION

It is, therefore, a principle object of the present invention to provide a method and apparatus for testing sensor assemblies carried by a tray for use in an electromagnetic heating system to determine if the sensor assemblies with ferromagnetic elements have been properly assembled to desired specifications.

Another object of the present invention is a method for testing sensor assemblies that inspects an electrical property of the sensor assembly and thereby eliminates visual inspection problems.

Another object is a method and apparatus for testing sensor assemblies that yields an indication in a definite manner such as "go" or "no go" indication of properly or improperly assembled sensor assemblies.

These and other objects of the present invention are efficiently achieved by accurately positioning the tray with sensor assembly to be tested in a predetermined relation to an electrically oscillating circuit including frequency determinative elements. The operating frequency of the circuit is responsive to the ferromagnetic element of the sensor assembly. A predetermined frequency is produced when a properly assembled sensor device is present and a distinctly different frequency is produced when an improperly assembled sensor assembly is positioned in the testing device. The oscillating circuit is connected to the detecting apparatus, such as a counter or a frequency meter, to provide an indication of the correct or distinctly incorrect frequency, to indicate whether the sensor assembly under test is properly assembled or is a reject device.

The invention both as to its organization and method of operation, together with further objects and advantages thereof, will best be understood by reference to the following specification taken in connection with the accompanying drawings.

BRIEF DESCRIPTION OF THE DRAWINGS

For better understanding of the invention, frequent reference will be made to the drawings wherein.

DESCRIPTION OF THE PREFERRED EMBODIMENT

Figure 1:
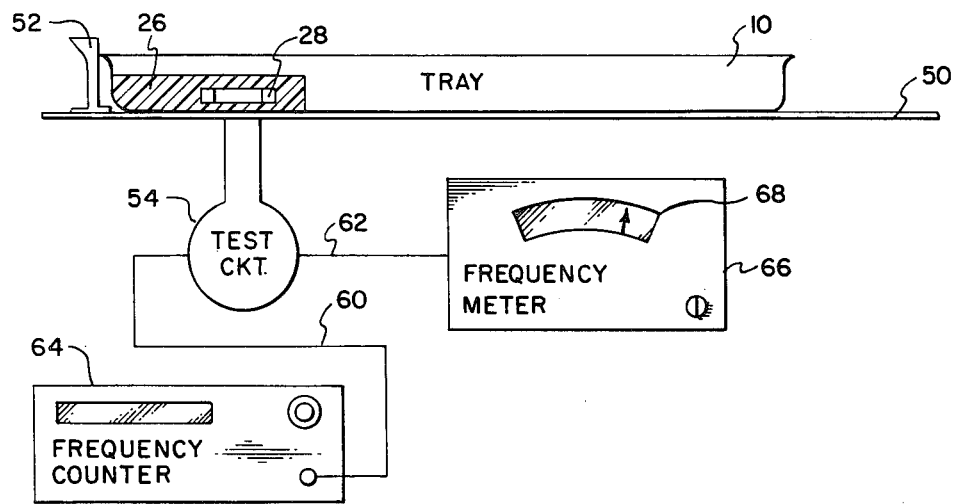
FIG. 1 is a front view, partly in section, of the testing apparatus of the present invention employed in practicing the method of the present invention, and illustrating a tray positioned to be under test.
Figure 2:
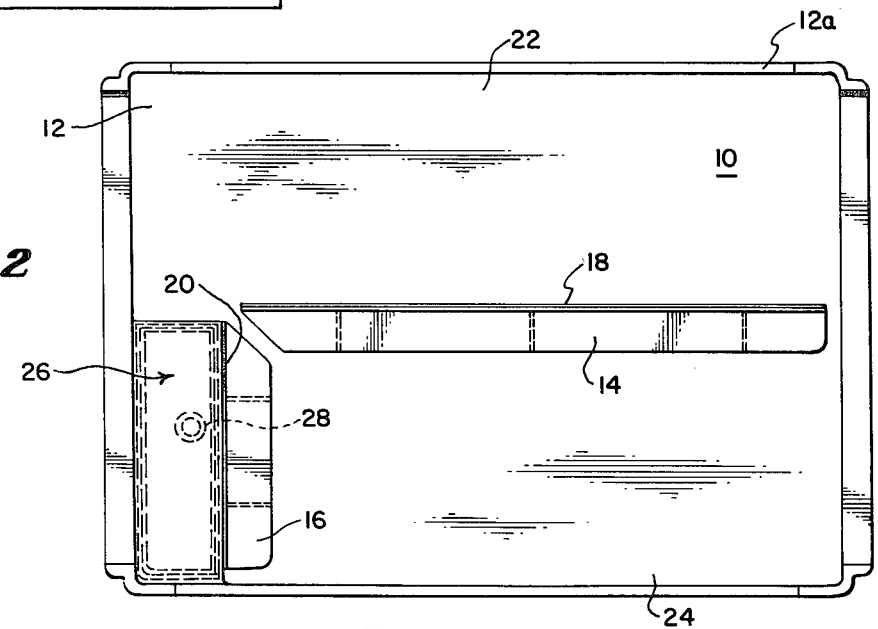
FIG. 2 is a plan view of the tray to be tested illustrating the sensor assembly.

Referring now to the drawings, there is shown in FIG. 1 a generally rectangular tray 10, positioned to be tested in the apparatus of the present invention. The generally rectangular tray 10, which is utilized in an electromagnetic heating system, is illustrated in more detail in FIG. 2 and has a bottom portion 12 with upturned edges 12a. Conductive base strips 14 and 16 secured to the upper surface of the bottom 12 support upstanding flanges 18 and 20, respectively. The upstanding flanges 18 and 20 act as shielding members, in cooperation with a movable shield member provided in the microwave oven, so as to define a first zone 24 within which items which are not to be heated may be placed and a second zone 22 in which various items to be heated may be placed, as described in more detail in U.S. Pat. No. 3,854,021 referred to previously. The body of the tray 10 is preferably constructed from sheet molded polyester fiberglass and includes a sensor assembly 26 positioned opposite the shielded zone 24 along base strip 16.

Figure 3:
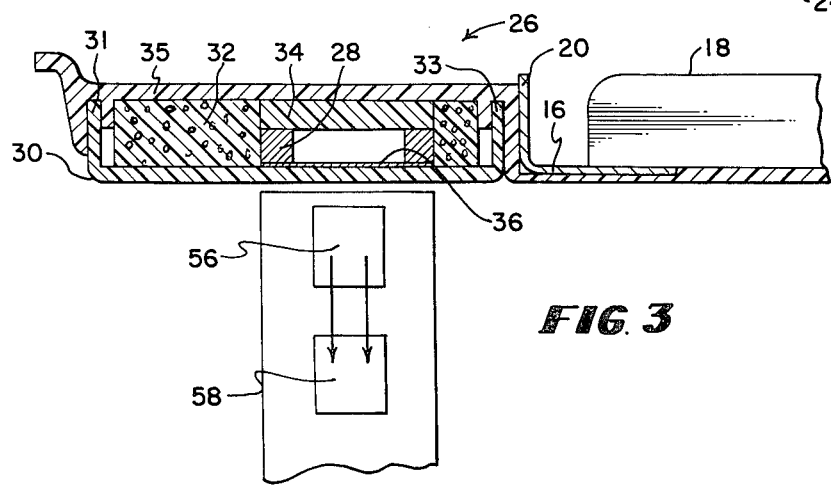
FIG. 3 is an enlarged sectional view of a portion of the tray, sensor assembly and test circuit of the apparatus and method of the present invention as shown in FIG. 1.

The sensor assembly 26, as shown in more detail in FIG. 3 comprises a cup shaped housing 30 of plastic material which is provided with upstanding rim portions 31, 33 which are adapted to fit in grooves formed in a raised portion 35 of the tray base 12. The raised portion 35 thus defines a bottom opening recess which is adapted to receive the housing 30. The housing 30 carries an annular shaped ferromagnetic sensing element 28 which should have a position relative to the tray 12 as shown in phantom in FIG. 2. The ferromagnetic element 28 is disposed near the bottom of assembly 26 within the sensor assembly housing 30 and is positioned by an electrically nonconductive member or block 32 which has a disc shaped hole or opening in which the ferromagnetic element 28 is positioned. A disc shaped electrically nonconductive member 34 is positioned on top of the ferromagnetic element 28 so as to interfit with member 32. An electrically conductive nonmagnetic disc member 36 is positioned on the bottom plane of the ferromagnetic element 28 and rests on the bottom surface of the housing 30. The sensor assembly, as illustrated in FIG. 3, represents one alternative of a properly assembled device, and is shown in the testing position with the tray 10 inserted in the testing apparatus of FIG. 1. Member 32 may be readily varied to change the location of the sensing element 28 on the tray 10 without changing any of the other components of the assembly 26. With this arrangement various energy absorbing conditions within the same or different ovens may readily be accomodated. Member 32 and 34 are fabricated from heat resistant material such as polyurethane foam for example. The material chosen for member 34 affects quite markedly the amount of energy coupled to element 28. If it is desired to couple more energy per unit of time to the element 28, polysulfone or some similar material appear to be preferable. Various combinations of different materials for member 32 and 34 as well as different relative positions of element 28 within member 32 may be desirable for various applications.

The tray 10 is supported within the inspection apparatus on generally planar surface 50 and upstanding portions 52 which are designed to properly position the inserted tray above the testing apparatus. When the tray is properly inserted and positioned within the testing apparatus, the ferromagnetic element 28 within sensor assembly 26 is positioned directly above and in close proximity with testing circuitry 54. Circuitry 54 includes an oscillating circuit with frequency determinative elements which are responsive to the presence of a properly assembled and positioned sensor 28 in the tray under test. As best seen in FIG. 3, the oscillator circuit includes a test coil 56 connected to other oscillator components 58. The oscillator circuit may be any of a number of conventional oscillator designs including inductive and capacitative frequency determining elements with a nominal operating frequency of approximately two Megahertz. The presence of a properly assembled and positioned sensor assembly 26 with ferromagnetic element 28 positioned above the test coil 56 produces an oscillator frequency which is utilized as the test reference frequency or standard with which to compare other trays and sensor assemblies under test. The outputs 60 and 62 of the test circuit 54 are connected to electronic meters or indicators such as frequency counter 64 and frequency meter 65 to provide an indication of the test results. The frequency counter 64 displays the frequency of the test circuit in numerical fashion, whereas the frequency meter 66 provides a relative visual indication by means of meter 68, so that a particular frequency corresponding to a tray under test may be compared to the reference frequency of a known properly assembled device. For example, the nominal oscillator frequency of a test circuit 54 may be adjusted to approximately two Megahertz. The absolute frequency is not of critical importance since it is the change in frequency as measured between a properly assembled tray and a tray under test which is of significance. If a tray in which the ferromagnetic element 28 has been omitted from the sensor assembly is inserted into the testing apparatus, the nominal operating frequency of a test circuit 54 will shift downward a distinctive amount, such as 0.01 Megahertz or more, from the reference frequency of two Megahertz, thereby indicating an improperly assembled device. Since the sensor 28 is not located in the center of the block 32, it is also possible to assemble the block 32 in the housing 30 so that the sensor 28 will be in the wrong position within housing 34, as from left to right or from front to back in FIG. 1. Also, the sensor with control disc 36 may be inserted in the block upsidedown, or the control disc 36 may be omitted. All of these conditions result in downward frequency shifts of approximately 0.01–0.02 Megahertz from the nominal frequency.

The apparatus and method of the present invention provides a simple determinative test commonly described as a "go - no go" inspection test to determine if a tray with sensor assembly is properly assembled such that it will function properly in the electro-magnetic heating system. Although a counter and frequency meter are shown, it should be understood that other detecting apparatus such as frequency discriminator or level sensing device both of conventional designs may be utilized in connection with frequency counting apparatus to provide a visual "go-no go" indication such as a lamp. The test operator, when preparing to inspect or test a number of trays, calibrates his testing apparatus by the insertion of a standard tray, in other words, one known to be assembled correctly for a given application, into the proper position as defined by the supports 52 with the sensor assembly 28 located above the test circuit 54. With the tray in position, the counter 64 and frequency meter 66 will display a frequency which may be adjusted by variable controls in a test circuit 54 to a convenient reference number on the frequency counter display or a meter indication as in the case of the frequency meter 66. The inspection apparatus is now calibrated and the operator may now successively position the trays to be tested in the apparatus of FIG. 1 and observe any differences in frequency readings of the trays under test relative to the reading obtained when a standard tray was used to calibrate the apparatus. If the tray under test indicates a reading within 0.01 Megahertz from the standard frequency, the tray assembly is considered good or acceptable. If the tray exhibits another frequency reading, the assembly may be easily replaced or repaired by removing the housing 30. Depending on the frequency displayed during test, it is possible to distinguish improperly assembled trays from trays assembled for alternative applications which have become accidentally included with another group of trays. A tray referred to as a "standard" tray is defined as being properly assembled for a given application or type of tray sensor assembly. Various "standards" or reference trays may be provided for testing the different alternative sensor assemblies.

From the foregoing it will be understood that the applicant has provided an apparatus and method for testing a sensor assembly located on a tray utilized in an electromagnetic heating system to determine whether or not the sensor element has been properly positioned and assembled by accurately positioning the tray in a predetermined relation to a test circuit that includes frequency determinative components that are responsive to the presence of the sensor assembly so as to produce an output frequency in the case of a properly assembled device which is distinctive from the operating frequency when an improperly assembled device is inserted into the apparatus.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by letters patent of the United States is:

1. Apparatus for testing a traysensor arrangement which is suitable for use in a microwave oven to determine whether a ferromagnetic sensor has been properly positioned and assembled on the tray, the testing apparatus comprising:
    frequency determinative circuit means for generating an electrical signal,
    means for positioning a tray in predetermined relation to said frequency determinative circuit means so that the frequency of said electrical signal is determined by the relative position of said ferromagnetic sensor on said tray, and
    frequency comparison meas, coupled to said frequency determinative circuit means, distinguishing among properly and improperly assembled trays, and trays assembled for alternative applications based upon frequency.

2. Apparatus for testing a tray-sensor arrangement as recited in claim 1 wherein said frequency determinative means includes a coil positioned in a predetermined relationship and in proximity to the ferromagnetic element on a tray when said tray is located by said positioning means.

3. Apparatus for testing a tray sensor arrangement as recited in claim 2 wherein said ferromagnetic sensor is generally disc shaped and said coil of said frequency determinative means is positioned such that the axis of said coil coincides with the central axis of said disc shaped ferromagnetic sensor.

4. Apparatus for testing a tray-sensor arrangement as recited in claim 1 wherein said frequency determinative means includes an active oscillator circuit.

5. Apparatus for testing a tray-sensor arrangement as recited in claim 1 wherein said frequency determinative means produces an output of a first frequency when said sensor assembly is properly assembled and positioned on the tray and produces an output of a second frequency distinctive from said first frequency when said sensor assembly is improperly assembled or positioned.

6. Apparatus for testing a traysensor arrangement as recited in claim 1 wherein said frequency comparison means coupled to said frequency determinative means indicates when said output frequency is within predetermined acceptable limits corresponding to a properly positioned and assembled ferromagnetic sensor.

7. A method for testing a sensor assembly carried by a tray to determine if a ferromagnetic sensor of the sensor assembly is properly positioned and assembled on said tray, comprising the steps of:
    positioning said tray with the sensor assembly thereof in close proximity to and in a predetermined relationship to an oscillator circuit including a frequency determining element that is responsive to the presence of ferromagnetic sensor of said assemly,
    determining the operating frequency of said oscillator circuit when said tray is positioned in said predetermined relation, and
    comparing the operating frequency of said oscillator circuit in said determining step of said tray under test relative to the frequency of said oscillator circuit when a tray with a known properly assembled and positioned ferromagnetic sensor is positioned in said predetermined relationship.

8. Apparatus for testing a traysensor arrangement which is suitable for use in a microwave oven to determine whether a ferromagnetic sensor has been properly positioned and assembled on the tray, the testing apparatus comprising:
    frequency determinative circuit means for generating an electrical signal, said frequency determinative means being positioned in a predetermined relationship to said ferromagnetic sensor to produce an output of a first frequency when said sensor assembly is properly assembled and positioned on the tray and being responsive to produce an output of a second frequency distinctive from said first frequency when said sensor assembly is improperly assembled or positioned; and
    frequency comparison means connected to said frequency determinative means for detecting the output frequency of said frequency determinative means, said comparison means indicating when said output frequency is within predetermined acceptable limits corresponding to a properly positioned and assembled ferromagnetic sensor and said comparison means also distinguishing trays assembled for alternative applications based upon frequency.

* * * * *